4 Sheets—Sheet 1.

E. S. SHIMER.

TYPE WRITING MACHINE.

No. 11,506. Reissued Sept. 3, 1895.

Witnesses:

A. M. Long.

D. W. Edelin.

Inventor:

Elmer E. Shimer, by Louis Bagger & Co.

attys.

4 Sheets—Sheet 2.

E. S. SHIMER.

TYPE WRITING MACHINE.

No. 11,506. Reissued Sept. 3, 1895.

Witnesses:

A. M. Long

D. W. Edelin

Inventor:

Elmer S. Shimer, by Laurs Pagge & Co

Attys.

E. S. SHIMER.

TYPE WRITING MACHINE.

No. 11,506. Reissued Sept. 3, 1895.

Witnesses:
A. M. Long
D. W. Edelin

Inventor:
Elmer S. Shimer,
by Louis Bagger & Co.
Attys.

4 Sheets—Sheet 4.

E. S. SHIMER.

TYPE WRITING MACHINE.

No. 11,506. Reissued Sept. 3, 1895.

Witnesses:
Am Long
D. W. Edelin

Inventor
Elmer S. Shimer
by Louis Bagger & Co.
Attys.

UNITED STATES PATENT OFFICE.

ELMER S. SHIMER, OF MILTON, PENNSYLVANIA.

TYPE-WRITING MACHINE.

SPECIFICATION forming part of Reissued Letters Patent No. 11,506, dated September 3, 1895.

Original No. 539,651, dated May 21, 1895. Application for reissue filed August 12, 1895. Serial No. 558,979.

*To all whom it may concern:*

Be it known that I, ELMER S. SHIMER, a citizen of the United States of America, residing in Milton, in the county of Northumberland, in the State of Pennsylvania, have invented certain new and useful Improvements in Type-Writing Machines, of which the following is a specification.

My invention has relation to improvements in type-writing machines; and it consists, first, in improved ribbon-feed and spool mechanism, and, second, in improved attachment for operating the signal or bell and adjusting the right-hand marginal stop.

These improvements are all fully described hereinafter, and their novelty particularly pointed out and distinctly claimed.

Figure 1:
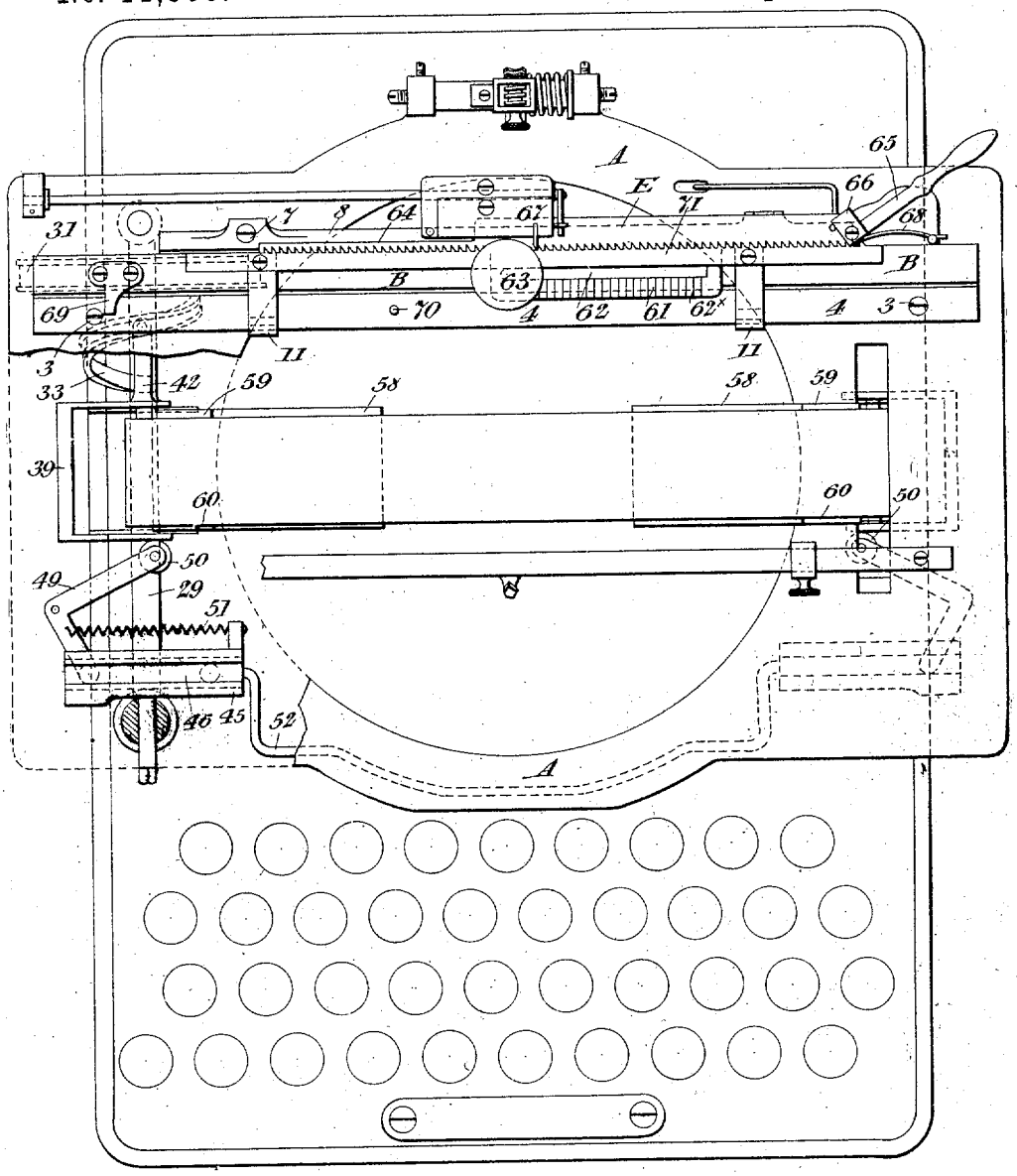
Figure 2:
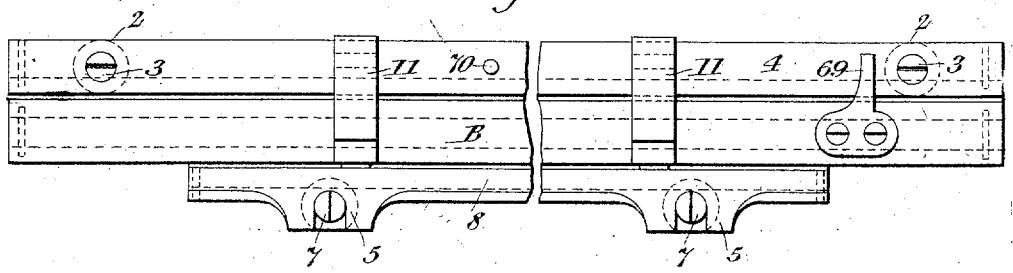
Figure 5:
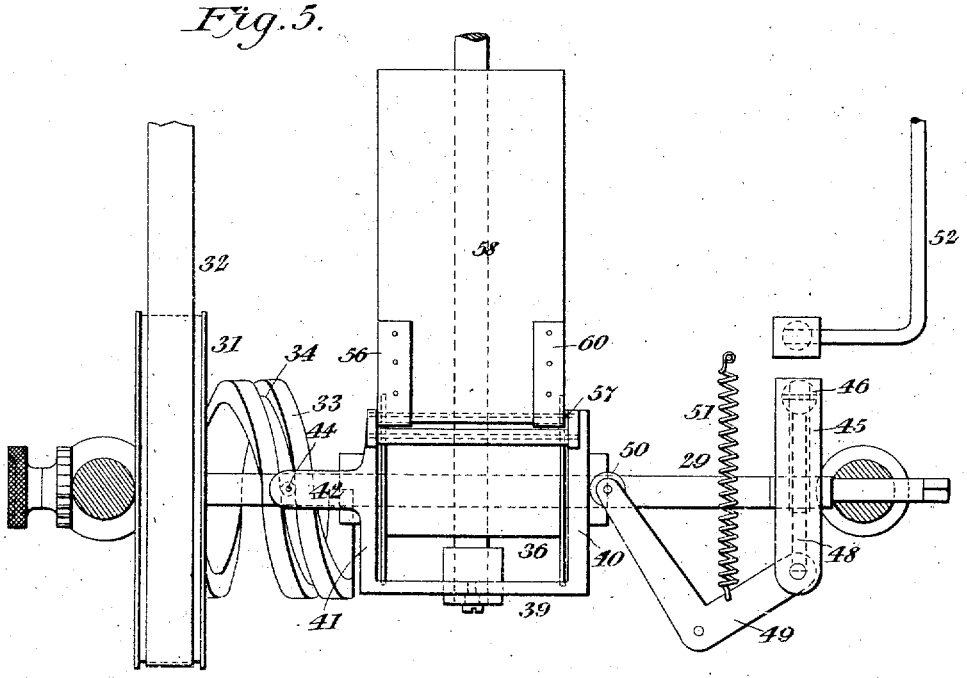
Figure 3:
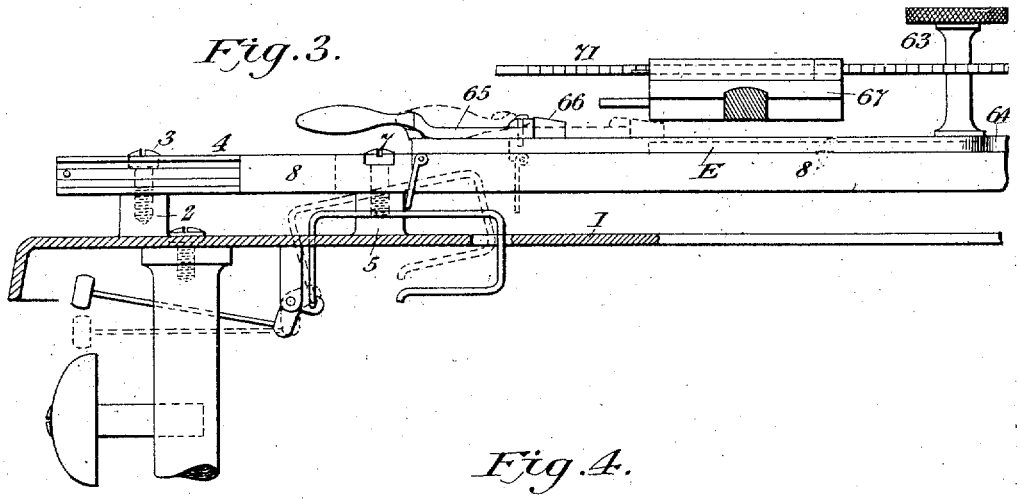
Figure 4:
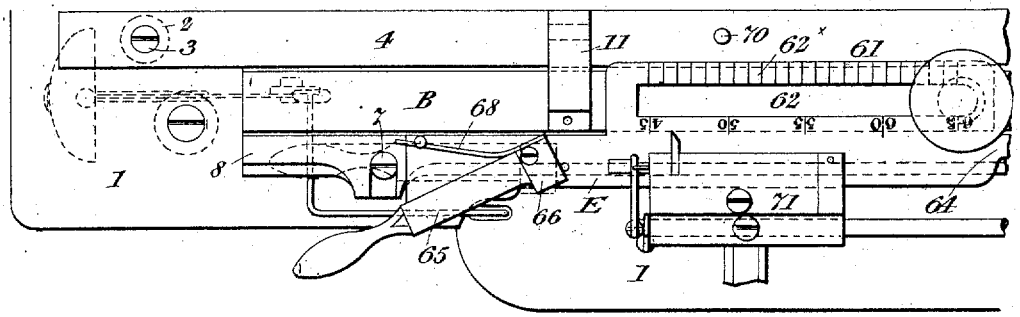
Figure 10:
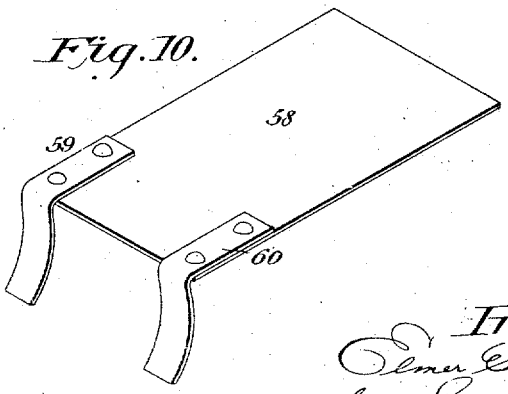
Figure 6:
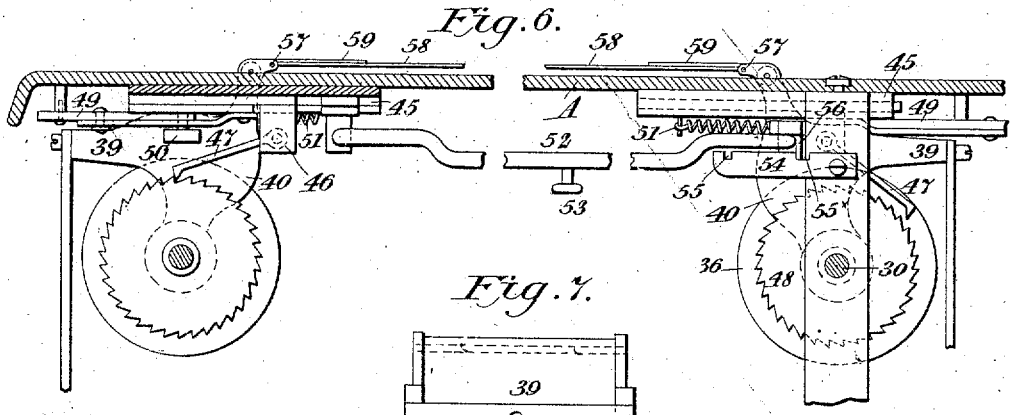
Figure 7:
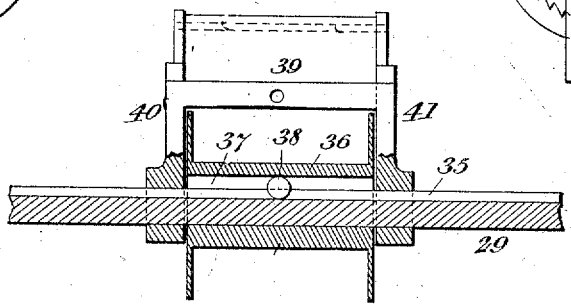
Figure 8:
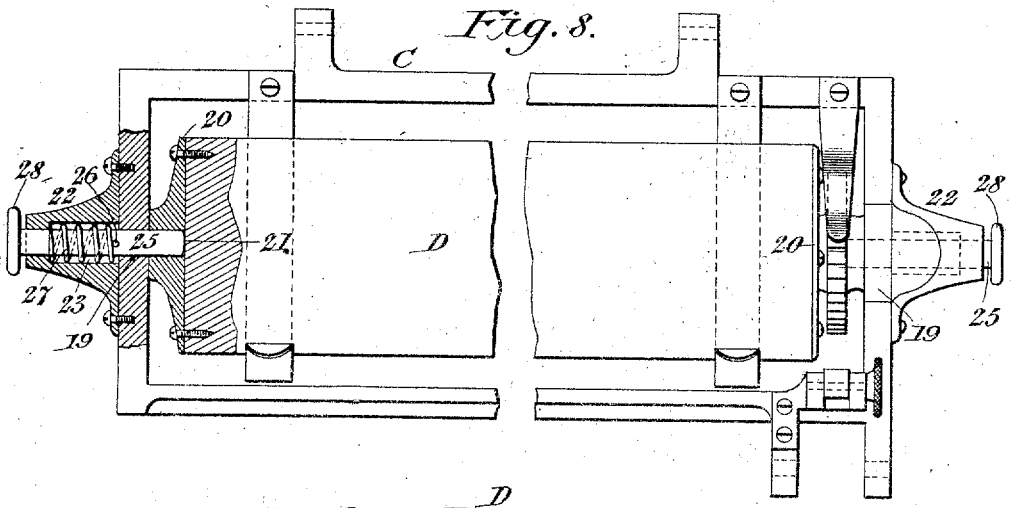
Figure 9:
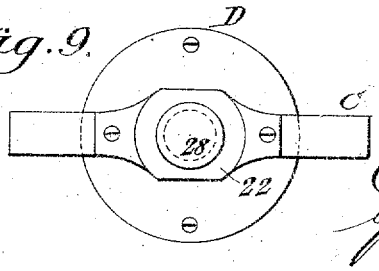

In the accompanying drawings I have fully and clearly illustrated my invention, and reference being thereto had, Figure 1 is a plan view of a type-writing machine, the top plate being broken away to show the ribbon mechanism and the shifting means for reversing the ribbon-feed. Fig. 2 is a detail plan view of the carriage-track and carriage-bar. Fig. 3 is a detail of the bell-ringing mechanism. Fig. 4 is a detail of the marginal stop or adjusting device and means for locking the spacing mechanism from reciprocating and the keys from being struck. Fig. 5 is a detail of the ribbon mechanism, taken at the motor end of the machine. Fig. 6 is a view of the ribbon-shifting mechanism. Fig. 7 is a section through the spool-shifter, the spool, and spool-shaft. Fig. 8 is a plan view of the carriage and roller-platen, showing the means for retaining and detaching the roller-platen, one of the bearings being shown in horizontal cross-section. Fig. 9 is an end view of the same. Fig. 10 is a view of one of the ribbon-carriers.

In the said drawings, A designates the top plate of the machine, on the surface of which are formed or secured two studs or supports 1 2, having threaded sockets in them to take the fastening-screws 3, which secure the front track-rail 4 of the carriage-track in position, and on the face of the top plate A are also two other supports 5, having threaded sockets in them to take fastening-screws 7, which hold the back rail 8 of the carriage-track fast, substantially as shown in Fig. 1 of the drawings. The rails 4 and 8 constitute the carriage-track and are arranged parallel to each other on the top plate of the machine and have their inner edges formed with grooves 9 10. Between these rails 4 and 8 is arranged the carriage-bar B, formed with vertical hinge lugs 11, to which the carriage is hinged by any suitable means, substantially as indicated in the drawings.

In connection with my improvements I have shown means for removing and replacing the roller-platen. Platens are changed for the reason that in manifolding a hard platen is desirable to obtain good impressions, and for ordinary writing a soft platen is preferable. Hence, if platens can be readily removed and replaced, those adapted especially to the use desired will be used interchangeably, and thus better results obtained in manifold work. These bearings can be applied to any type-writing machine of the style carrying a roller-platen.

Referring particularly to Fig. 8 of the drawings, C designates the carriage-frame, having bearings 19 in its end bars to take in the bearing-pins, hereinafter described, and D designates the roller-platen, to the respective ends of which are secured end plates 20, formed with central bearing-sockets 21, substantially as shown in the drawings. To each end bar of the carriage is secured a cap 22, formed with a socket 23 and having the end provided with a bearing-hole 24, registering with the bearings of the end bar of the carriage-frame.

25 is a bearing-pin let through the bearings 19 and 24 and setting in the socket 21 of the roller-platen. In the bearing-pins is fixed a stud 26, and on each pin is arranged a spring 27, which forces the bearing-pin inward into the socket in the end of the platen. On the outer ends of the bearing-pins is a milled head 28 for convenient manipulation.

It will be perceived that whenever it is desired to remove a platen the bearing-pin at either end of the carriage, or both pins, for that matter, may be drawn outward against the force of the spring until the inner end is withdrawn from the socket in the roller, and then the roller may be lifted out of its place and it will drop free from its bearings. The like manipulation of the bearing-pins will permit the replacement of the platen.

My first improvement relates to the mechanism for operating the ribbon and shifting or reversing the direction of the longitudinal movement thereof, and this is accomplished by the following described mechanism: At the respective ends of the machine are journaled spool-shafts 29 30, which, so far as the spools are concerned, are duplicates in construction. On the shaft 29 is loosely mounted the spring-motor 31, having connection with the carriage-bar by a strap 32 and controlled by a ratchet, as usual. On the spring-motor is carried a spiral 33, in the outer face of which is formed a groove 34, which is engaged by an antifriction-roller 44 on an arm on the spool-shifter. In each of the spool-shafts is cut a half-round groove 35, extending the desired distance. The spools 36 have their hubs fitted to slide on the shafts, and in the core or bore of the spools is formed a half-round groove 37, and in the registered grooves is arranged a ball 38, which has its bearing in the groove and serves to lessen the friction of the parts when the spools slide back and forth on the shafts. The spool-shifters consist of a bar 39, having depending arms 40 41 loosely embracing or lying against the end faces of the spools, and having the spool-shaft projected through them, as shown. The apertures of the arms 40 41 are of the diameter of the spool-shaft, so that the groove in the bore of the spool is closed at the ends and the ball-bearing thus prevented from being released or escaping from the groove during the shifting of the spools. The top bar of the spool-shifter adjacent to the spring-motor has an arm extending therefrom, as at 42, on the end of which is journaled an antifriction-roller 44, which engages in the groove 34 of the spiral 33, this connection serving to shift the spools when the motor and the spiral are rotated. The two spools are shifted in unison and simultaneously by means of connection through a rock-shaft journaled on the base of the machine and provided with arms, the upper ends of which engage lugs on the spool-shifters, substantially as shown and described in my former patent.

To turn the spools and move the ribbon longitudinally I mount under the top plate of the machine a way 45, and in this arrange a slide 46, to which is loosely hung a pawl 47, which engages the teeth of a ratchet-wheel 48, fixed on each spool-shaft, and to the inner face of the top plate of the machine, at each end thereof, is fulcrumed a bell-crank lever 49, the short arm of which is jointed to the end of the slide 46, and the long arm of the lever carries an antifriction-roller 50, which bears on the side face of the frame of the spool-shifter as shown, the contact of the roller being maintained by means of a spring 51, having one end fastened to the short arm of the lever and the other end secured to a suitable fastening on the machine-plate. These mechanisms for turning the spools at each end of the machine are duplicates and are arranged to operate in drawing the ribbon in reverse directions. To reverse the direction of the longitudinal movement of the ribbon a bail-rod 52 is provided, having the ends hung to the inner ends of the slides 46, and in the middle of the bail-rod is attached a finger-piece 53, to grasp in shifting the bail-rod. By shifting this bail-rod 52 in either direction the slides carrying the shifting-pawls are correspondingly moved to bring one of the pawls in position to engage one of the ratchet-wheels on the spool-shafts and to throw the other pawl out of engagement. The spools are then rotated a limited distance and the ribbon carried longitudinally by the spool at the end of the machine where the pawl engages its ratchet wheel, the other spool being free to turn with its shaft with the pawl disengaged. To hold the pawl and slide out of engagement and from operating the spool a small latch-piece 54 is fixed to the front post of the machine, and in this are two notches 55 55×, which are engaged by a lug 56 on the end of the bail. By shifting the bail and setting the lug in one of the notches one of the bell-crank levers and pawls are held out of use. It will be perceived that when the carriage is drawn back and the spools shifted on their shafts that the lateral movement of the spool against which the operating bell-crank lever engages moves that lever and the lever moves the slide which carries the pawl and that in turn, through its engagment with the ratchet-wheel on the spool-shaft, rotates the spool substantially the width of a type, thus bringing a new surface of the ribbon in service at each movement of the carriage to the right.

To carry the ribbon from contact with the machine a small supporting-rod 57 is secured just in advance of the top bar of the spool-shifter, and on this support the ribbon-carrier 58 is sustained, which consists of a flat piece of suitable material, to which are secured two thin metal strips 59 60, bent at substantially right angles to the carrying-plate and adapted to set or rest on and over the rod 57. The carriers are thus moved always in alignment with the ribbon and are carried laterally with it by the spool-shifters.

In Fig. 4 of the drawings is illustrated an adjusting device for fixing the length of the line and means for stopping the progress of the carriage and locking the movement of the keys.

Referring to the drawings, E designates a bar or plate adapted to lie on the rear track-rail of the carriage-track and formed with a lateral plate extension 61, projecting over the carriage-bar, as shown in Fig. 1 of the drawings. In the plate extension 61 is a longitudinal slot 62, having on it a scale 62×, corresponding with the scales on the front of the machine and carriage. The plate E is adjustably and detachably set on the carriage-bar by a clamping-screw 63, let into the bar and clamping with its shoulder down on the plate. The right-hand portion of the plate E on the inner edge is straight, and sets against the rear face of the right-hand lug on the carriage-bar, and from the other end or left-hand portion of the plate E is extended a bar 64, the inner edge of which is in line with the inner edge of the right-hand portion and sets against the rear face of the left-hand hinge-lug of the carriage-bar, so that by setting the edge of the plate and bar against the hinge-lugs it properly aligns and is in proper position longitudinally, and moving the plate lengthwise brings the scale to any desired position in relation to the clamping-screw, and the distance traveled by the carriage may be adjusted, limited, and controlled. The limit of movement of the carriage is effected by means of a lever 65, fulcrumed on the right-hand end of the plate E, having a flat head 66, which runs under the spacing-bracket 67 and prevents that from being moved down, thus locking the spacing mechanism and at the same time locking the keys from striking the types. A spring 68 keeps the lever 65 always in proper position. When the head of the lever 65 runs under the spacing-bracket, the carriage is stopped from moving to the left, and then if it is desired to complete a word or strike a hyphen the handle of the lever 65 is pulled inward, which releases the head from the spacing-bracket and permits the carriage to be moved one space forward to strike the desired character. On the carriage-bar is a stop 69, which lodges against a pin 70 on the front track-rail and stops the carriage in its movement to the right.

The spacing mechanism is substantially identical with that shown and described in previous patents, and the rack-bar 71 is of the usual construction and secured to the carriage-bar to move therewith, being fastened to the hinge-lugs of the carriage-bar, as shown in the drawings.

Having thus described my invention, what I claim, and desire to secure by Letters Patent, is—

1. The combination of the spool-carrying shaft formed with a longitudinal groove, a ribbon-spool mounted on the shaft and formed with a groove in the bore of the spool, a ball-bearing in the grooves, and a spool-shifter frame having depending arms at the ends of the spool with the shaft projected through them and closing the ends of the groove in the spool, substantially as and for the purpose specified.

2. The combination with a mechanism for shifting the spools laterally, of a bell-crank lever mounted to bear with one arm against the shifting-frame of the spool, a slide connected to one arm of the bell-crank lever, a pawl on the slide, a ratchet wheel on the spool-shaft, and a spring to hold one arm of the lever against the shifting frame of the spool, substantially as and for the purpose specified.

3. The combination with the bell-crank lever, the slides and the pawls, to engage the ratchet-wheels on the spool-shafts, of a shifting-bail having its ends connected to the ends of the slides, and means to hold the bail in a shifted position whereby one of the pawls may be thrown out of engagement with one of the ratchet-wheels and the longitudinal movement of the ribbon reversed.

4. The combination of the carriage-bar, the space-bar mounted on the carriage-bar, the spacing mechanism, a plate E, on the carriage-bar formed with a longitudinal slot, a clamping-screw to hold the plate on the carriage-bar, a lever on the end of the plate E, a pendant on the end of the plate, and the bell-mechanism, as and for the purpose described.

In witness whereof I have hereto set my hand in the presence of two attesting witnesses.

ELMER S. SHIMER.

Attest:

JOS. ANGSTADT,
A. G. HEYLMUN.